UNITED STATES PATENT OFFICE 2,625,381

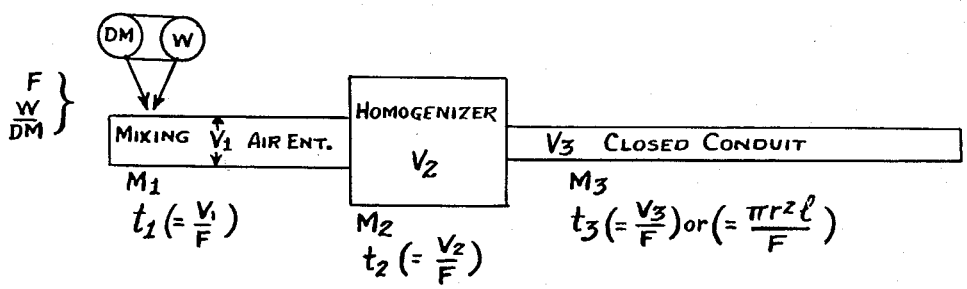
*Fig.1.*
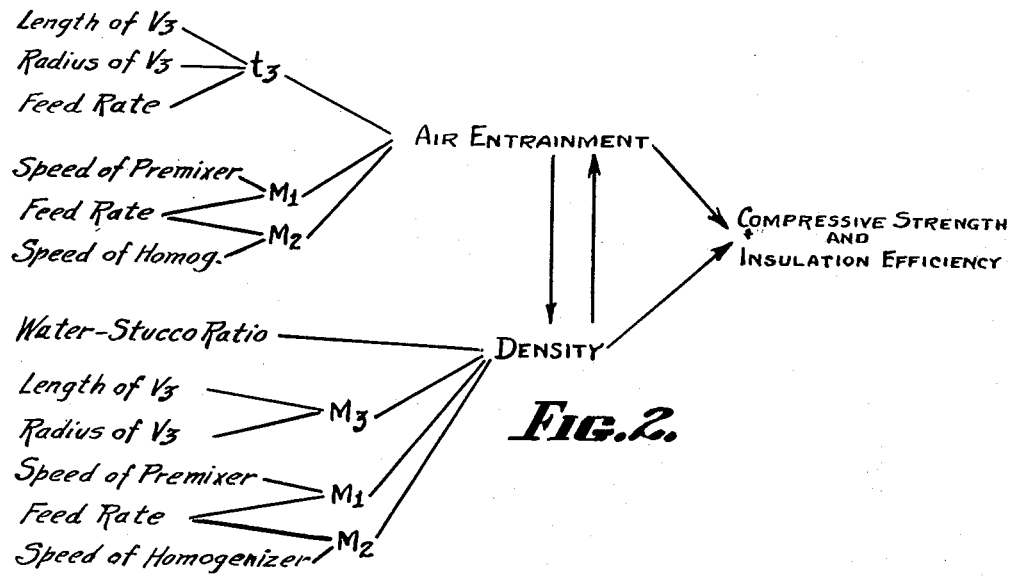
*Fig.2.*
*Fig.3.*
$$T_S \leftarrow (F, V_1, V_2, V_3, M_1, M_2, M_3, \tfrac{W}{DM})$$
(Best determined experimentally for a given set of conditions)
$$T_c = .4 T_S = (t_1 + t_2 + t_3)$$
Inventor
ROBERT F. ZIMMERMAN
AND JOHN H. HOGE,
By
Attorneys.

PROCESS OF CONTINUOUSLY PREPARING A GYPSUM SLURRY

Robert F. Zimmerman and John H. Hoge, Cincinnati, Ohio, assignors to Hoge, Warren, Zimmerman Co., Cincinnati, Ohio, a partnership Application October 18, 1950, Serial No. 190,824

7 Claims. (Cl. 259—148)

This invention relates to a process of continuously producing a gypsum slurry and is a continuation-in-part of our copending application, Serial No. 9,435, filed February 19, 1948, now Patent 2,538,891, issued January 23, 1951. The process has to do with the continuous mixing of dry calcined gypsum, with or without fiber added, and water and the entraining and entrapment of air into the mix to form a gypsum slurry which upon crystallization forms a cementitious material known as gypsum composition used in the construction of preformed or monolithic structural slabs, insulating blocks, fills, coatings and the like.

Ever since gypsum has been used for purposes such as described herein, it has been prepared for use in the field by one of a number of batch processes. A conventional process which has been in use for some forty-five years, and which is still quite prevalent today, involves the use of a mortar box and a mixing hoe. Water is first introduced into the mixing box and then bags of gypsum are simply cut open and dumped into the water while a laborer mixes the materials with a hoe. In this process the first dry gypsum to enter the water is provided with a large excess of water of crystallization, and crystallization of the first batch begins under ideal conditions as to excess water. As each succeeding bag is dumped into the water in the mortar box there is less excess water for crystallization, so that the crystallization of the gypsum from succeeding bags not only starts later in point of time, but requires more time for the gypsum particles to contact their necessary water. If four or five bags of gypsum are added, it is clear that the last bag must be very thoroughly mixed in order that it may be brought into contact with its necessary water of crystallization.

A batch of gypsum mixed as just described really consists of four or five masses, each of which is at a different stage in the crystallization process so that the batch as a whole is not homogeneous. Even though the batch be hand mixed as thoroughly as possible for the limited time before setting begins, if it be dumped out on the ground and turned over somewhat with a hoe, large clumps of substantially dry gypsum will be encountered. Of course, as other parts of the batch proceed with their crystallization the excess of water from those parts will ultimately wet the dry clods, but the final product when set up is definitely not uniform or homogeneous. It has a very poor structural strength, in comparison to the potential strength which it would have had, if it had been thoroughly and homogeneously wetted and mixed. This becomes obvious after a study of the cross section of hand poured material and its lack of uniformity in the crystalline structure, resulting from an uneven growth of the crystals, and their inability to join on their optimum planes which of course tends to create non-uniform voids, and results in uneven distribution of tensile and compressive stresses throughout the mass.

In addition to the manual method described above, gypsum has recently been mixed by machines, but still in a batch process. According to one process there is provided a cylindrical container having rotating agitator blades or rods at the bottom. A pipe encircles the cylinder at the top and is provided with a number of orifices through which the water is added, followed by one or two bags of dry gypsum. When one batch is mixed, in the judgment of the operator, a gate at the bottom is opened and the mixed product flows out. Then another batch is mixed.

Yet another machine has comprised a motor driven beater mounted on a tilting stand by means of which a batch of water and gypsum was beaten up in a deep wheelbarrow or the like, which was brought under the machine. When one wheelbarrow full was mixed, that barrow was rolled away and another barrow brought under the machine. This machine might be compared to the conventional soda fountain milk shake mixers.

The last two described processes made the mixing operation quicker, but did not overcome the faults of the hand batch mixing process. The individual batches could not be made perfectly uniform and homogeneous, and furthermore there was always a variation from one batch to the next because the matter of quantities of ingredients used and length of mixing time were dependent on the judgment of the operator.

In our copending application above referred to we described a machine for preparing a gypsum slurry for use. With that machine we have produced very superior slabs, but we have also found that with that machine slabs could be produced which were not of ideal characteristics. We have now discovered certain controlling factors which must be observed in connection with the preparation of a gypsum slurry for use, and the principal object of the present invention involves the setting forth of a method of mixing a gypsum slurry and preparing it for use whereby regardless of the particular characteristics of the gypsum being used a definite slab having predetermined desired characteristics can be achieved.

With the foregoing considerations in mind it is the fundamental object of our invention to provide a process of producing a gypsum slab of ideal crystalline structure and therefore having optimum and uniform strength. The process, which is the objective of the present invention, involves the steps of metering and premixing gypsum, with or without cellulosic fibers, and water, and entraining air therein, homogenizing the slurry so obtained, holding the homogenized slurry in a state of agitation in a closed system for a length of time as close as possible to, but not past the critical point, and discharging the slurry for use. The closed system may be a vessel of suitable size and form, or it may include or be a conduit through which the slurry may be caused to pass by gravity, by dragging or pushing devices, or by pumping. The homogenizing step may be carried out by a centrifugal pump, in which case the homogenizer also produces movement of the slurry through the conduit. It is an object of our invention to displace all the gypsum above what is necessary to achieve the required test strength for the purpose in question. The displaced gypsum may be replaced by air, shavings, perlite, water, etc., and the resulting slab will be cheaper and lighter than has heretofore been possible.

One of the basic objects of the present invention is to meter the dry calcined gypsum and the water in a proportion determined by the ultimate characteristics desired in the finished slab. It is therefore an object of our invention to provide a process for continuously mixing calcined gypsum and water, to form a gypsum slurry for use and continuously delivering it to the point where it is to be used.

It is yet another object of our invention to provide for the addition of water of crystallization to the dry calcined gypsum, or other liquids to other dry materials while they are in a state of high turbulence and to provide for the addition of the water or other liquids by means of jets or sprays.

Our objects further include the maintenance of the material being premixed in a state of turbulence or agitation whereby to insure that substantially each particle of the calcined gypsum will quickly come into contact with the water of crystallization necessary to it, whereby to produce a homogeneous and uniform mix, thereby providing for a uniform crystalline growth.

Again, it is an object of our invention to cause free air to be entrained in and be beaten into the slurry and homogenized therein, and to cause said air to be held therein the consistency of the slurry has reached the point where escape and dehomogenization of the air is no longer a problem; so that a slab or other formation poured from the mixed material will be characterized by a uniform fine porosity so that the resultant slab will have enhanced insulating properties in addition to a lower density.

Another important object of our invention is to pass the slurry through a closed system and to deliver it for use after a period of time as close to, but not more than, the critical time and to maintain the slurry in a state of continuous agitation while it is in said closed system.

It is yet another object of our invention to attain the optimum possible strength in the final resultant slab and to control the variable factors discussed above to achieve the strongest slab possible.

These and other objects of our invention which will be pointed out in more detail hereinafter or which will be apparent to one skilled in the art upon reading these specifications, we accomplish by that series of process steps of which we shall now describe certain exemplary embodiments.

Reference is made to the drawings forming a part hereof and in which:

Figure 1 is a diagrammatic showing of the stages of our process and is not necessarily representative of any particular machine.

Figure 2 is a diagrammatic representation of various factors involved in our process and showing their effect on the ultimate strength and density, and Figure 3 graphically illustrates the relationship between total setting time and critical time.

Gypsum as mined is in a di-hydrate state ($CaSO_4 \cdot 2H_2O$). Its refinement, effected by calcining, requires heat, and drives off moisture to produce ($CaSO_4 \cdot \frac{1}{2}H_2O$) dry calcined or hemi-hydrate gypsum. The reaction is:

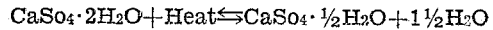

$$CaSO_4 \cdot 2H_2O + Heat \rightleftharpoons CaSO_4 \cdot \tfrac{1}{2}H_2O + 1\tfrac{1}{2}H_2O$$

To produce gypsum composition from this material, sufficient water is added to recrystallize it to its original from $CaSO_4 \cdot 2H_2O$.

At a certain point in the setting cycle (about ninety-five to ninety-seven per cent of complete conversion of the hemi-hydrate to the di-hydrate of gypsum) the appearance of the slab changes definitely, clearly and almost instantaneously from a wet or moist appearance to a substantially dry appearance. This is not a complete set as pointed out above, but it is a convenient standard for field use and hereinafter when we refer to total set or total setting time it will be understood that we mean the length of time from the instant of wetting the dry calcined gypsum with water up to the time when this change in cast or appearance takes place.

During the setting cycle the raw calcined gypsum, or the hemi-hydrate, is converted into the di-hydrate. By careful observation under a microscope it will be observed that there is no apparent change for a considerable length of time. However, at a certain time in the cycle the beginning of the conversion from the hemi-hydrate state into the di-hydrate state can be observed under a microscope. The time when the beginning of this conversion takes place has been called the critical time. It has been experimentally determined that the critical time is approximately forty per cent of the total setting time; that is, if with a particular gypsum a period of thirty minutes is necessary from the instant that the gypsum particles are brought in contact with their necessary water of hydration until the total set (that is, when the change in appearance takes place), then if the process is observed under a microscope it will be found that at twelve minutes one will be able to observe the beginning of the conversion of the hemi-hydrate into the di-hydrate. In that particular instance the critical time would be twelve minutes, and the critical point would be that point in the process at which the conversion of the hemi-hydrate into the di-hydrate becomes observable under a microscope. No matter what the total setting time of a particular slurry is (and this setting time will vary depending upon the source of the gypsum and its state of purity, etc.) the critical time will always be approximately forty per cent of the total setting time.

We have now discovered that if raw calcined gypsum and water are continuously brought into intimate contact in predetermined proportions and are violently agitated to form a slurry having a creamy uniform texture and to entrain air therein and said slurry is then passed through a closed system in a state of agitation for a period of time as close as possible to, but not past, the critical point as defined above we will produce a slab having optimum compressive strength characteristics with a minimum practical density. In other words, according to our invention we are carrying on the mixing or agitation of the slurry for the maximum permissible time. This maximum permissible time is approximately forty per cent of the total setting time as defined, or the entire critical time.

In carrying out our process we continuously meter the dry calcined gypsum and water and bring them into intimate contact in such a manner that substantially each particle of the raw calcined gypsum is brought into contact with its necessary water of crystallization and its proportionate share of excess water present. We violently agitate the slurry to entrain air thereinto and we then homogenize the slurry so as to make it completely uniform and to break up the entrained air into minute bubbles which will have a minimum buoyancy. We then maintain the slurry in a closed system in a state of agitation and release or discharge it for use at a point in its crystallization cycle at or just before the critical point.

The metering step is indicated at the left hand end of the diagram of Figure 1 and in the diagram the proportion of water to the raw calcined gypsum is indicated by $$\frac{W}{DM}$$

This is often referred to as water-stucco ratio. The water-stucco ratio has an important effect on the total setting time. The more water that is added to a given quantity of dry calcined gypsum, the longer the mixture takes to set or, in other words, the longer it takes for the hemihydrate of gypsum to change completely to the di-hydrate of gypsum. This is due to the cooling effect of the water which counteracts the accelerating effect of the heat liberation which takes place during the process. The conversion of the hemi-hydrate to the di-hydrate of gypsum is an exothermic reaction and heat is liberated which accelerates the crystallization reaction, but when the water-stucco ratio is increased the cooling effect of the water counteracts the accelerating effect of the heat liberation.

The water-stucco ratio also has an effect on the ultimate compressive strength of the slab. Thus it is well known that if the water-stucco ratio is reduced, that is, if there is less water per unit of gypsum, the resulting slab will be stronger. An important point involved in our procedure is the use of an excess of water coupled with extreme speed of operation so that when the process is complete an excess of water remains. In the mixing of gypsum according to the prior art wherein the gypsum is mixed with wood fiber it has been customary to use approximately eleven gallons of water for each hundred pounds of gypsum. When mixing according to conventional procedures the setting time is relatively so long that the wood fiber which is mixed with the gypsum soaks up a very large quantity of water and in effect removes much excess water. Practically speaking, in the prior art using eleven gallons of water per hundred pounds of dry substance a density of about fifty-five pounds per cubic foot was achieved. Of the eleven gallons per hundred pounds substantially three gallons were absorbed into the wood fiber so that only approximately eight gallons per hundred pounds remained for crystallization, lubrication and displacement of gypsum.

By speeding up the setting time we cause the setting process to commence so rapidly that very little if any water is absorbed into the wood fiber. We have found from experience that with eight and one-half gallons per hundred pounds of dry substance we can produce a slab having a density of forty-five pounds per cubic foot so that in effect our slab contains substantially twenty per cent less gypsum than the slab of the prior art. Of the eight and one-half gallons per hundred pounds substantially none is absorbed by the wood fiber and therefore the entire amount is available for crystallization, lubrication and gypsum displacement. An illustrative example may be drawn as follows:

In a batch process each cubic foot of gypsum requires five and one-half gallons of water broken down thus: one gallon for crystallization, one and one-half gallons for absorption by the wood fiber, leaving three gallons as free water. The resulting set gypsum has a density of fifty-five pounds per cubic foot. We have therefore three gallons of free water per fifty-five pounds of set gypsum or .055 gallon per pound. In our process each cubic foot of dry gypsum requires four and one-quarter gallons of water broken down thus: one gallon for crystallization, three and one-quarter gallons as free water and zero for absorption by the wood fiber. The resultant set gypsum has a density of forth-five pounds per cubic foot so that we have three and one-quarter gallons of free water per forty-five pounds of set gypsum or .072 gallon per pound. From the foregoing figures it can be seen with our process we have thirty-one per cent more free water than in the box process, even though we are using less water than in the box process. The additional free water can and does displace gypsum in the finished slab.

The control of the water-stucco ratio gives flexibility in determining the ultimate strength to be achieved. The ultimate strength having once been established can be continuously maintained or it can be varied at will.

The water indicated by the symbol W and the gypsum or dry mix indicated by the symbol DM in the drawing are metered to give the desired water-stucco ratio $$\left(\frac{W}{DM}\right)$$

The materials are fed into a mixing instrumentality at a feed rate indicated by the symbol F.

In the premixing instrumentality or during the premixing step we perform a mixing operation indicated by the symbol $M_1$. This mixing operation is carried on for a time $t_1$ which is equal to $$\frac{V_1}{F}$$

in which $V_1$ is the volume of the premixing chamber and F again is the feed rate.

It has been pointed out above how the reaction of crystallization liberates heat and that heat accelerates the reaction. We capitalize, so to speak, on this accelerating effect and maintain a constant and continuous reaction which proceeds at the maximum speed and will release the maximum amount of the available heat to be liberated in a minimum of time. The temperature is continuously and constantly at its maximum. The elimination of the tremendous amount of excess water requisite with prior art processes further enhances the accelerating effect because there is less water which would provide a cooling effect and to some extent counteract the accelerating effect in question. Since we achieve a tremendous accelerating effect as outlined above, we find it unnecessary and undesirable to use artificial accelerators. Another effect of our accelerated reaction is that in accordance with well known laws of crystallization a rapid crystallization produces small and uniform crystals, so that the ultimate structure is homogeneous and of great strength because the crystals have combined in their optimum relationship. Such results have not been attained in the past because the reaction was a relatively slow reaction so that the crystals grew to a larger size and were not able to combine in the optimum way, and it is for this reason among others that the prior art was not able to obtain the compressive strengths which we have been able to obtain for the same density of the slab.

The intensity of mixing to which the slurry is subjected has an effect on the setting time of the gypsum. The more violently and rapidly the mixing operation is carried on, the more the setting time is shortened. There is therefore an element of control in the speed of the mixing instrumentality.

In the case of batch mixing by hand approximately three of the four minutes before setting begins are consumed in mixing. This would leave only a few minutes for conveying the mixture to its destination before setting begins. Mechanical batch mixing machines have reduced mixing time to one minute or less and have produced a better mixture than the hand process as regards consistency and thoroughness. However the flow of mixed material from any batch mixing apparatus is intermittent, and with intermittent flow it is impossible to pump batch mixed material because of the plating effect whereby small portions of the slurry will set on pump parts and transmission lines cumulatively and will act as an accelerant to the setting of following material so that eventually any such system will clog with set material. Such clogging necessitates frequent cleaning out of the system which is costly and substantially offsets any time or labor savings which might otherwise be attained.

In contrast by a continuous mixing procedure as described we are enabled to produce a creamy even texture in the slurry in a matter of two to four seconds. Such a supply of material can be pumped and although the setting time has been deliberately expedited, as pointed out above, sufficient time is still available before setting begins, that is, before the critical point, to make it possible to use long enough closed transmission lines to make the entire process practicable.

We have hereinabove mentioned the plating effect of gypsum. If gypsum is mixed to a thick consistency it may act like a layer of damp putty and adhere to a surface simply because it is not fluid enough to flow off. This is not truly an adhesive property such as is found in glues and resins but a property whereby gypsum in setting will form a structurally strong film or plating on the surface no matter how smooth it is unless that surface is subject to fairly constant washing. Once such a film or plating begins to form it acts as a blotter in soaking up gypsum from succeeding streams of unset material, holding a new layer which then sets at an accelerated rate. Because hydrated gypsum is a very effective accelerant its presence in the form of a film or plating on surfaces in or adjacent newly mixed material produces great irregularity in setting time with consequent difficulties to the workmen who are finishing the material. This difficulty is largely eliminated by continuous mixing as discussed above.

After our material has been premixed, that is, after substantially instantaneously each particle of gypsum has been contacted by the necessary amount of water the slurry is violently agitated to make a smooth mixture and to entrain air. It is not enough however simply to entrain air in the slurry. We have found that no matter how much air is entrained in the slurry air will continuously try to escape. Since we desire to produce the lightest possible slab for a given compressive strength, it is desirable to entrain and hold in the slurry the maximum possible amount of air consistent with that strength.

In order to retain as much air as possible we then homogenize the slurry. In our copending application referred to above we have shown a centrifugal type of pump of the so-called "open impeller" type which is used commonly for the pumping of paper stock or the like. This pump has the important function of homogenizing and while homogenization can be accomplished by a pump of the type mentioned it can be accomplished by one or another of the conventional homogenizing apparatuses. The homogenizing step breaks up the entrained air bubbles, which were of sufficient size normally to have enough buoyancy to cause them to rise and escape from the slurry, into minute air bubbles which do not have enough buoyancy to rise through the slurry. We find that it is necessary to break up the large air bubbles into such minute bubbles that the possibility of entrapping them and holding them in the slurry may be realized. The homogenizing device not only breaks up the air bubbles into very minute bubbles but distributes them evenly throughout the slurry.

The homogenizing step also produces a further mixing which is exemplified in Figure 1 by the symbol $M_2$. $M_2$ is affected by the feed rate and by the speed of the homogenizer, and it can be seen from Figure 2 that $M_2$ has an effect on air entrainment and on density. Air entrainment and density are of course mutually related in that the greater the amount of air entrained, the lower the density of the final slab. The length of time of the homogenizing step is indicated by the symbol $t_2$ which of course equals $$\frac{V_2}{F}$$

where $V_2$ is the volume of the homogenizer and $F$ is the feed rate as before. It may be pointed out here that the total of $t_1+t_2$ in our process is measured in terms of seconds, less than four seconds, while $t_1$, only, according to prior art processes was measured in terms of about four minutes.

In order to entrap the maximum possible amount of air in the slurry, we then maintain the slurry in a closed system for a period of time as close to the critical point as possible but not beyond the critical point. By maintaining the slurry in a closed system, as set forth, no opportunity is provided for even minute air bubbles to break out of the slurry and when the material is discharged from the closed system, as will be set forth hereinafter, the slurry has reached such a state of incipient crystallization that any entrapped air can no longer break out of the slurry. We have found from experience that by the use of our process we are able to replace up to fifteen per cent of the gypsum with air. This important result is accomplished with no artificial air entraining agents. Referring again to the drawings, we have indicated the volume of the closed conduit or vessel by the symbol $V_3$, and the symbol $M_3$ designates the mixing action which takes place in the closed system. This mixing action $M_3$ depends upon the length of the closed conduit and its radius, and the length of time $t_3$ in the closed conduit of vessel equals $$\frac{V_3}{F} \text{ or } \frac{\pi r^2 l}{F}.$$

The total of the closed system is represented by $V_2+V_3$, and the total length of time in the closed system is equal to $t_2+t_3$. Since $t_1+t_2$ is a matter of not more than four seconds, $t_3$ substantially equals the critical time. Strictly speaking, of course, $t_1+t_2+t_3$ must not exceed the critical time.

Finally, we discharge the material for use at a point in the crystallization process at or just short of the critical point. By this time, as outlined above, the material has reached such a state in its crystallization process where its viscosity is such that the entrained and entrapped air bubbles can no longer escape. At this point also the mixing operation $M_1+M_2+M_3$ has been carried on for that length of time which will produce the maximum ultimate strength in the structure when it has set. The ultimate strength of the structure depends upon the degree and the duration of agitation up to the critical point, that is, the more violently the slurry is agitated, the stronger the final structure will be. Similarly, the longer the agitation is carried out up to the critical point, the stronger the final structure will be. If agitation is carried on beyond the critical point, the final structure will not be as strong because at the critical point the new forming crystals begin to grow together and further agitation simply pulls them apart. It is therefore of the greatest importance that regardless of the violence or duration of agitation it should not be carried beyond the critical point.

We have pointed out above how the speed of the homogenizer and the speed of the mixer have an effect on reducing the total setting time and therefore the critical time so that the more violently the material is agitated, the shorter the critical time is. Thus the length of the hose line will often have to be determined by the exigencies of the occasion. On a particular job for example it may be necessary to have a hose line which is considerably longer than would otherwise be necessary. If this is so, we know from what has been said above that the setting time and the critical time will again be shortened because the material is continuously being mixed in the hose line. If that time is shortened, it is then necessary to insure that the material passes through the system more rapidly so that it will not remain in the system in excess of the critical time. This can be accomplished for example by increasing the volume of the material passing through the system. Thus for example, by reference to Figure 1, the air entraining and premixing portion may be considered as having a volume $V_1$. The closed homogenizing device or pump may be considered as having a volume $V_2$, and the closed conduit or hose may be considered as having a volume $V_3$. The sum of these volumes, i. e. $V_1+V_2+V_3$, is the volume of the system. If the volume of the system, by way of example, is ten cubic feet and if one cubic foot per minute is being sent through the system, the mixing time is ten minutes. It will be clear that if it has been found out, as above outlined, that the critical time is actually six minutes, the material will have to be fed through the system more rapidly, and it will be necessary to feed ten/sixths cubic feet per minute through the system in order that each element of the slurry is in the system under agitation for only six minutes. The same considerations apply to the diameter of the hose line.

The process as outlined herein is necessary to the production of slabs having optimum strength and density characteristics, so that the mere provision of an apparatus for the continuous mixing of a gypsum slurry will not produce the desired results unless the steps of our process and the various controls discussed above are observed. We have in our copending application, above referred to, described an apparatus which if properly operated will produce the results set forth herein, and other apparatuses may be used to achieve the results if the teachings of our present application are followed.

While in the foregoing description we have referred to the preparation of a gypsum slurry, it is to be understood that many of the principles hereinabove outlined are applicable to the preparation of any slurry of a dry material which is settable upon hydration, and water.

It will be understood that modifications may be made without departing from the spirit of our invention and that we therefore do not intend to limit ourselves except as pointed out in the claims which follow.

Having now fully described our invention, what we claim as new and desire to secure by Letters Patent is:

1. A process for continuously preparing a settable slurry for use, which includes the steps of metering a comminuted dry, cementitious material which is settable within a determinable time after hydraton, metering water, bringing said metered dry material and water into intimate contact and continuously and violently agitating them to form a slurry having a creamy, uniform texture, and to entrain air therein, passing said slurry promptly into a closed system, and subjecting said slurry, continuously throughout said closed system, to a mixing action, for a period of time which closely approaches but does not exceed the critical conversion point of the slurry, and discharging said slurry from said closed system for immediate use.

2. A process for continuously preparing a gypsum slurry for use, which includes the steps of metering dry, calcined gypsum, metering water, bringing said metered gypsum and water into intimate contact and continuously and violently agitating them to form a slurry having a creamy, uniform texture, and to entrain air therein, passing said slurry promptly into a closed system, and subjecting said slurry, continuously throughout said closed system, to a mixing action for a period of time which closely approaches but does not exceed the critical conversion point of the slurry, and discharging said slurry from said closed system for immediate use.

3. A process for continuously preparing a gypsum slurry for use, which includes the steps of metering dry, calcined glysum, metering water, bringing substantially each particle of said metered gypsum into intimate contact with more than its necessary water of crystallization, and continuously and violently agitating said gypsum and water to form a slurry having a creamy, uniform texture, and to entrain air therein, passing said slurry promptly into a closed system, and subjecting said slurry, continuously throughout said closed system, to a mixing action for a period of time which closely approaches but does not exceed the critical conversion point of the slurry, and discharging said slurry from said closed system for immediate use.

4. A process for continuously preparing a gypsum slurry for use, which includes the steps of metering dry, calcined gypsum, metering water, bringing said metered gypsum and water into intimate contact and continuously and violently agitating them to form a slurry having a creamy, uniform texture, and to entrain air therein, passing said slurry promptly into a closed system, homogenizing the entrained air in said slurry in said closed system, and subjecting said slurry, continuously throughout said closed system, to a mixing action for a period of time which closely approaches but does not exceed the critical conversion point of the slurry, and discharging said slurry from said closed system for immediate use.

5. A process for continuously preparing a gypsum slurry for use, which includes the steps of metering dry, calcined gypsum, metering water in the proportion of about eight and one-half gallons of water per one hundred pounds of dry gypsum, bringing said metered gypsum and water into intimate contact and continuously and violently agitating them to form a slurry having a creamy, uniform texture, and to entrain air therein, passing said slurry promptly into a closed system, homogenizing the entrained air in said slurry in said closed system, and subjecting said slurry, continuously throughout said closed system, to a mixing action for a period of time which closely approaches but does not exceed the critical conversion point of the slurry, and discharging said slurry from said closed system for immediate use.

6. A process for continuously preparing a gypsum slurry for use, which includes the steps of metering dry calcined gypsum, metering water in excess of the amount required for the recrystallization of the gypsum, bringing said metered gypsum and water into intimate contact and continuously and violently agitating them to form a slurry having a creamy, uniform texture, and to entrain air therein, passing said slurry promptly into a closed system, homogenizing the entrained air in said slurry in said closed system, and subjecting said slurry, continuously throughout said closed system, to a mixing action for a period of time which closely approaches but does not exceed the critical conversion point of the slurry, and discharging said slurry from said closed system for immediate use, whereby there remains an excess of water after said gypsum has completed its recrystallization.

7. A process of producing and delivering for use a slurry of gypsum and water, which comprises commingling gypsum and water to form a pumpable slurry, maintaining a continuous supply of said slurry, continuously propelling said slurry into and through an elongatable conduit against a resistance head, and subjecting said slurry, during the entire time it is in said conduit, to a mixing action, so as to deliver said slurry for immediate use at the end of said conduit, at a time which closely approaches but does not exceed the critical conversion point of said slurry.

ROBERT F. ZIMMERMAN.
JOHN H. HOGE.

REFERENCES CITED

The following references are of record in the file of this patent:

UNITED STATES PATENTS

| Number | Name | Date |
|---|---|---|
| 1,588,059 | Schumacher | June 8, 1926 |
| 1,660,402 | Thomson | Feb. 28, 1928 |
| 1,765,544 | Schuster | June 24, 1930 |
| 2,464,523 | Muench | Mar. 15, 1949 |
| 2,538,891 | Zimmerman et al. | Jan. 23, 1951 |